(12) United States Patent
Hirota (10) Patent No.: US 8,212,958 B2
(45) Date of Patent: Jul. 3, 2012

(54) DISPLAY PANEL FITTING STRUCTURE

(75) Inventor: Hideyuki Hirota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 150 days.

(21) Appl. No.: 12/866,229

(22) PCT Filed: Feb. 5, 2009

(86) PCT No.: PCT/JP2009/000448
§ 371 (c)(1),
(2), (4) Date: Aug. 4, 2010

(87) PCT Pub. No.: WO2009/141937
PCT Pub. Date: Nov. 26, 2009

(65) Prior Publication Data
US 2011/0002733 A1 Jan. 6, 2011

(30) Foreign Application Priority Data
May 20, 2008 (JP) .................................. 2008-131830

(51) Int. Cl.
*G02F 1/1335* (2006.01)

(52) U.S. Cl. ........................................................ 349/58
(58) Field of Classification Search .................... 349/58
See application file for complete search history.

(56) References Cited

U.S. PATENT DOCUMENTS

| | | | | |
|---|---|---|---|---|
| 6,919,937 | B2 * | 7/2005 | Kim et al. | 349/58 |
| 7,646,447 | B2 * | 1/2010 | Kim et al. | 349/58 |
| 8,068,191 | B2 * | 11/2011 | Choi | 349/58 |
| 2002/0157847 | A1 | 10/2002 | Chiriku et al. | |

FOREIGN PATENT DOCUMENTS

| | | |
|---|---|---|
| JP | 3-79482 U | 8/1991 |
| JP | 5-33577 U | 4/1993 |
| JP | 11-219134 A | 8/1999 |
| JP | 2000-253332 A | 9/2000 |
| JP | 2000-294025 A | 10/2000 |
| JP | 2002-330524 A | 11/2002 |
| JP | 2004-1603 A | 1/2004 |
| JP | 2004-119622 A | 4/2004 |
| JP | 2008-46431 A | 2/2008 |

\* cited by examiner

*Primary Examiner* — James Dudek
(74) *Attorney, Agent, or Firm* — Birch, Stewart, Kolasch & Birch, LLP (57) ABSTRACT

A display panel fitting structure includes two or more pairs of fitting means 8, 9 between two panels 1, 2 which are detachably fixed to and held by each other with the mating faces thereof mated with each other. Each fitting member is disposed such that the fit between each of the two or more pairs of fitting means is made by slide of one of the two panels in a predetermined sliding direction Z determined as a direction in which the panel is slid with respect to the other panel when the panels are assembled, and the fitting structure further includes a lock means 30 enabling to maintain the fitting state established by the fitting means and release the fitting engagement of the fitting means.

1 Claim, 13 Drawing Sheets

DISPLAY PANEL FITTING STRUCTURE

TECHNICAL FIELD

The present invention relates to a display panel fitting structure.

BACKGROUND ART

Figure 23:
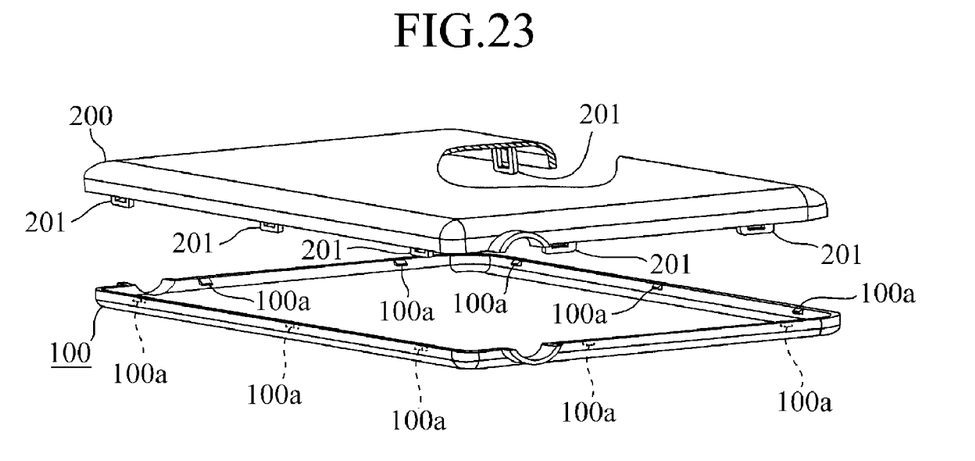
FIG. 23 is an exploded perspective view explaining a conventional display panel fitting structure.
Figure 24:
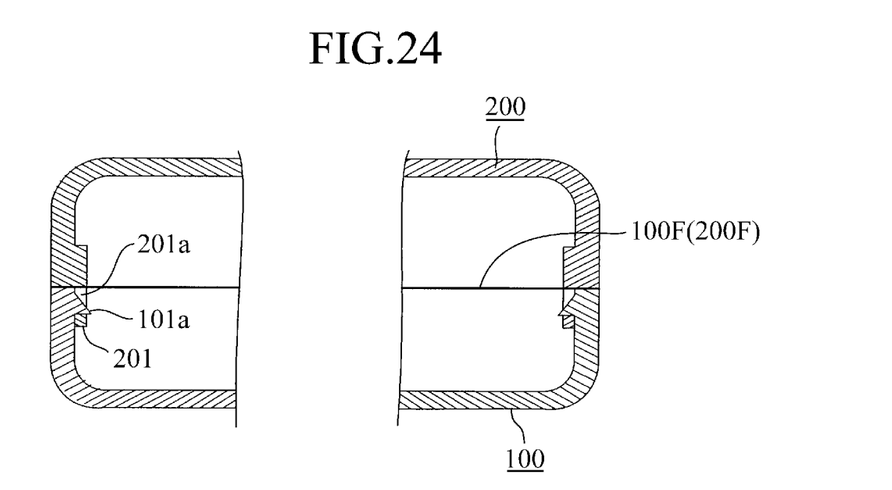
FIG. 24 is a sectional view explaining the conventional display panel fitting structure.
Figure 25:
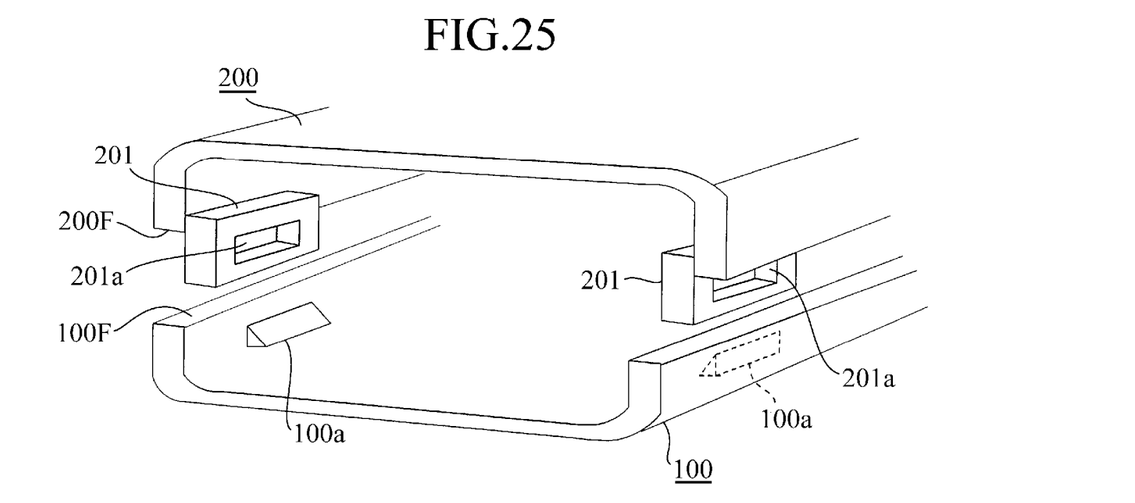
FIG. 25 is a perspective view explaining the conventional display panel fitting structure.

As a display panel fitting structure for a liquid crystal display that internally houses a board or the like, as shown in FIG. 23 to FIG. 25, there is provided a structure which is composed of two generally rectangular panels, a front panel 100 and a back panel 200, and in which rectangular frame edge portions on the open end side of the panels form mating faces 100F, 200F, respectively, and the mating faces 100F, 200F are mated with each other to be fixed to and held by each other. In the past, the structure further includes: a construction in which a front panel 100 has convexities 100a each working as a hook, and a back panel 200 has projections 201 each having a hole 201a against which the convexity 100a of the front panel 100 catches, or a construction in which those convexities 100a and projections 201 are interchanged between the side of the front panel 100 and the side of the back panel 200.

A plurality of pairs of convexities 100a and projections 201 are provided internally at intervals throughout the periphery of the rectangular frame edge portions on the open end sides of the respective panels. In such a structure, when both the panels are mated to be fixed and held, both the panels are pressed to each other vertically in the figure such that the mating faces 100F, 200F are firmly coupled to each other. In the process, the projection 201 is resiliently deformed on the free end side thereof by the convexity 100a, thus fitting the convexity 100a into the hole 201a, and also giving a closely contacting state of the mating faces 100F, 200F with each other to achieve an integration of both the panels.

In a display panel fitting structure thus assembled, it is very rare to be disassembled after completion of the assembly. Nevertheless, the need for disassembly can arise from the necessity of an internal check. In order to disassemble the structure, it is necessary to disengage the convexity 100a fitted in the hole 201a therefrom. However, after the assembly, the holes 201a and the convexities 100a are located internally in both the panels as shown also in FIG. 25, and further the mating faces 100F, 200F are closely contacted with each other. Thus, it is difficult to insert a tool thereinto from outside, and it is extremely difficult to inwardly flex the projection 201 having the hole 201a to remove the convexity 100a from the hole 201a.

For this reason, prying the coupled panels open with a tool can damage the portion of the projection 201. Once thus disassembled, the back panel 200 sometimes has to be replaced with a new one. Thus, it is demanded to provide a display panel fitting structure which can be disassembled without breakage in a fitting section, and enables reuse of the panel.

There is a technique (e.g., see Patent Document 1) relating to a structure for holding a cover member, in which a cover member for covering the back of a main body is fixed on the main body to hold the cover member, the structure including a pair of first mounting concavities provided at spacings in the main body; a pair of second mounting concavities provided at spacings in the main body; a pair of first projections that are provided protrudingly in the cover member and are fitted into the pair of first mounting concavities, respectively, by sliding the cover member, to be fixed therein; and a pair of second projections that are provided protrudingly in the cover member and are fitted into the pair of second mounting concavities, respectively, by pushing the cover member in a direction different from the sliding direction of the cover, to be fixed therein.

The purport of the technique concerning the structure for holding the cover member disclosed in Patent Document 1 is to provide a structure for holding a cover member and an electronic apparatus in which a cover member can be readily and positively fixed on the back of a main body to be held thereon and the cover member does not get detached easily from the main body. When the cover member is fixed on the back of the main body of a liquid crystal display, the following two steps are undergone (paragraphs 0040-0043): (1) a step that slides a first projection of the cover member to be attached to a first mounting concavity, and (2) a step that pushes a second projection of the cover member to a second mounting concavity to be fitted thereinto. Also, an intricate structure therefor is required.

In view of the above, it is demanded to provide a display panel fitting structure such that the assembly and disassembly are readily performed, and that working processes thereof are also simple.

Patent Document 1: JP-A-2004-119622

DISCLOSURE OF THE INVENTION

The present invention has been made to solve the above-mentioned problems, and an object of the present invention is to provide a display panel fitting structure such that the assembly and disassembly are readily performed, and that working processes thereof are also simple.

A display panel fitting structure according to the present invention includes: two or more pairs of fitting unit each composed of a first fitting member provided on one of two panels which are detachably fixed to and held by each other with mating faces thereof mated with each other and a second fitting member which is provided on the other of the two panels and enables to engage with the first fitting member, wherein each fitting member is disposed such that the fit between each of the two or more pairs of fitting unit is made by slide of one of the two panels in a predetermined sliding direction determined as a direction in which the panel is slid with respect to the other panel when the panels are assembled, and wherein the fitting structure further includes a lock unit enabling to maintain the fitting state established by the fitting unit and release the fitting engagement of the fitting unit.

According to the present invention, a display panel fitting structure can be provided such that the assembly and disassembly are readily performed, and that working processes thereof are also simple.

BRIEF DESCRIPTION OF THE DRAWINGS

FIGS. 6 (*a*) and (*b*) are perspective views for explaining a positional relation between a pair of fitting means immediately before engagement.

BEST MODE FOR CARRYING OUT THE INVENTION

Embodiments of the present invention will now be described with reference to the accompanying drawings in order to explain the present invention in more detail.

First Embodiment

Figure 1:
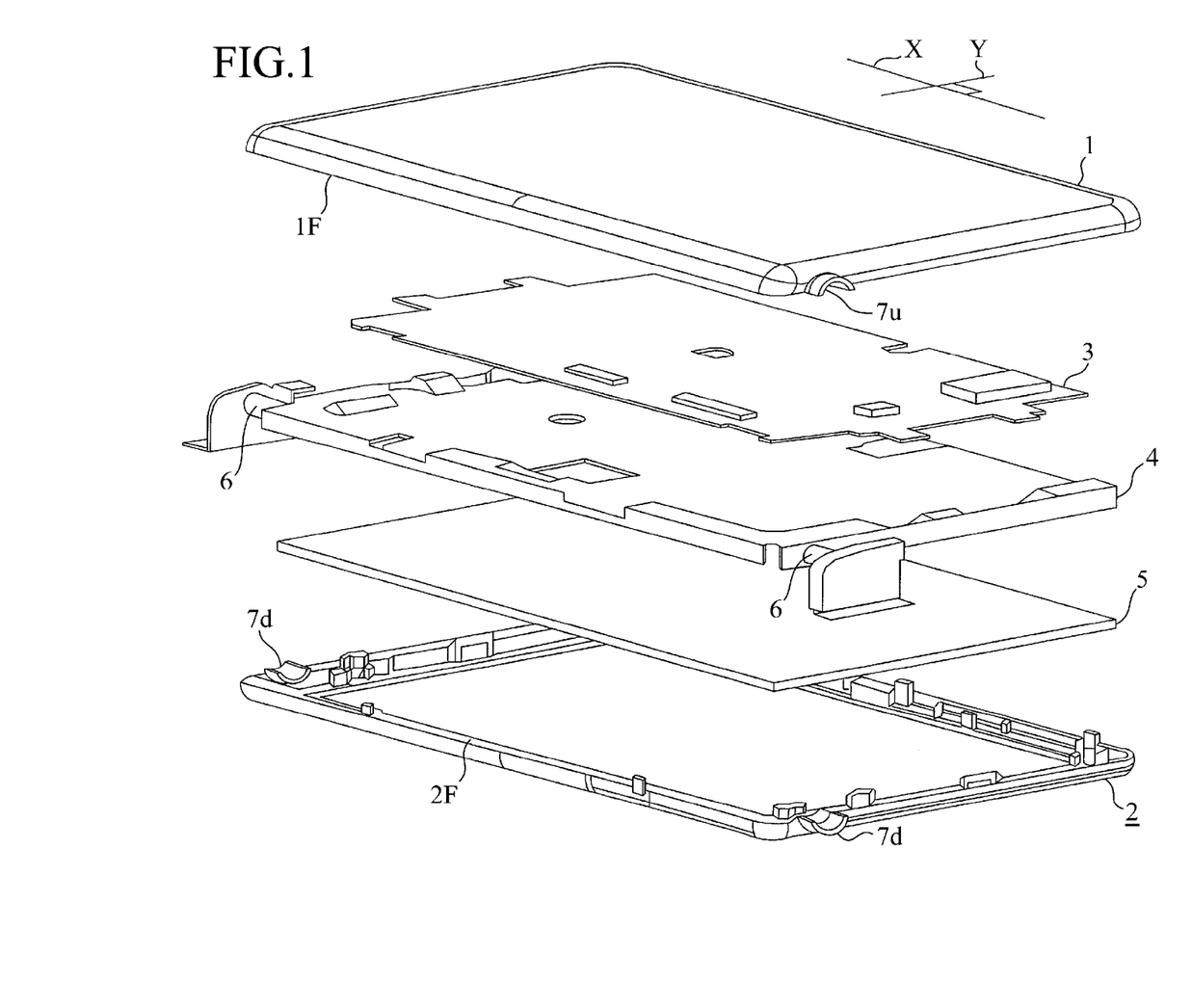
FIG. 1 is a perspective view showing a basic structure of a display panel.

Referring to FIG. 1, a basic structure of a display panel to which a display panel fitting structure according to the present invention is applied will be explained. In FIG. 1, a front panel 1 and a back panel 2 are arranged in a relation where the panels are detachably fixed to and held by each other with the respective mating faces 1F, 2F mated with each other. The front panel 1 is located uppermost, having a substantially rectangular shallow casing shape, with a downwardly extending portion thereof forming a generally rectangular structure portion, and the front panel forms the mating face 1F for mating with the back panel 2 using a generally rectangular flat edge section on the lower open end side in the frame-shaped structure portion. The back panel 2 located lowermost in FIG. 1 is substantially rectangular, is a frame-shaped structure member of an L-shaped cross section, and the panel forms the mating face 2F that is mated with the mating face 1F of the front panel 1 with a generally rectangular flat edge section on the upper open end side in the frame-shaped structure portion thereof.

A board 3, a holder 4, and a liquid crystal 5 are positioned between the front panel 1 and the back panel 2 in order from the top, and the assembly is carried out by fitting the liquid crystal 5 into the front panel 1 and fixing the holder 4 to the front panel 1 with screws so as to sandwich the board 3 therebetween, followed by fitting the back panel 2 to the front panel 1. In the holder 4, two end portions opposed to each other in the longitudinal direction (direction X) have respective shaft parts 6 projecting in the direction X therefrom.

Since the shaft part 6 projects outwardly from the display panel in the assembling situation, shaft-holding protrusions 7u, 7d having a half-moon-shaped cross section for holding the shaft part 6 are respectively provided on the front panel 1 and the back panels 2 by projecting in the direction x from the areas in proximity to the mating faces corresponding to the places occupied by the shaft part 6. The protrusions 7d projects in the longitudinal direction X from the end portion in the longitudinal direction X of the back panel 2 and the protrusions 7u projects in the longitudinal direction X from the end portion in the longitudinal direction X of the front panel 1, respectively. The protrusions 7u, 7d projecting to the same side make a pair to hold the shaft part 6 with a combined tubular portion. In the following descriptions, only the combination of the front panel 1 and the back panel 2 will be discussed, and discussions about the board 3, the holder 4, the liquid crystal 5, and so on to be held at the midpoint between the panels will be omitted. In addition, the direction orthogonal to the longitudinal direction X in a plane parallel to the flat top face of the front panel 1 is referred to as the "transverse direction Y."

(A Pair of Fitting Means)

In FIG. 2 to FIG. 6, when the front panel 1 is assembled to the back panel 2, a predetermined slide direction Z is defined as a direction in which the front panel 1 is slid to the back panel 2; the direction Z is directed from the side arranged by protrusions 7u, 7d along the transverse direction Y to the side of no-protrusions.

Figure 2:
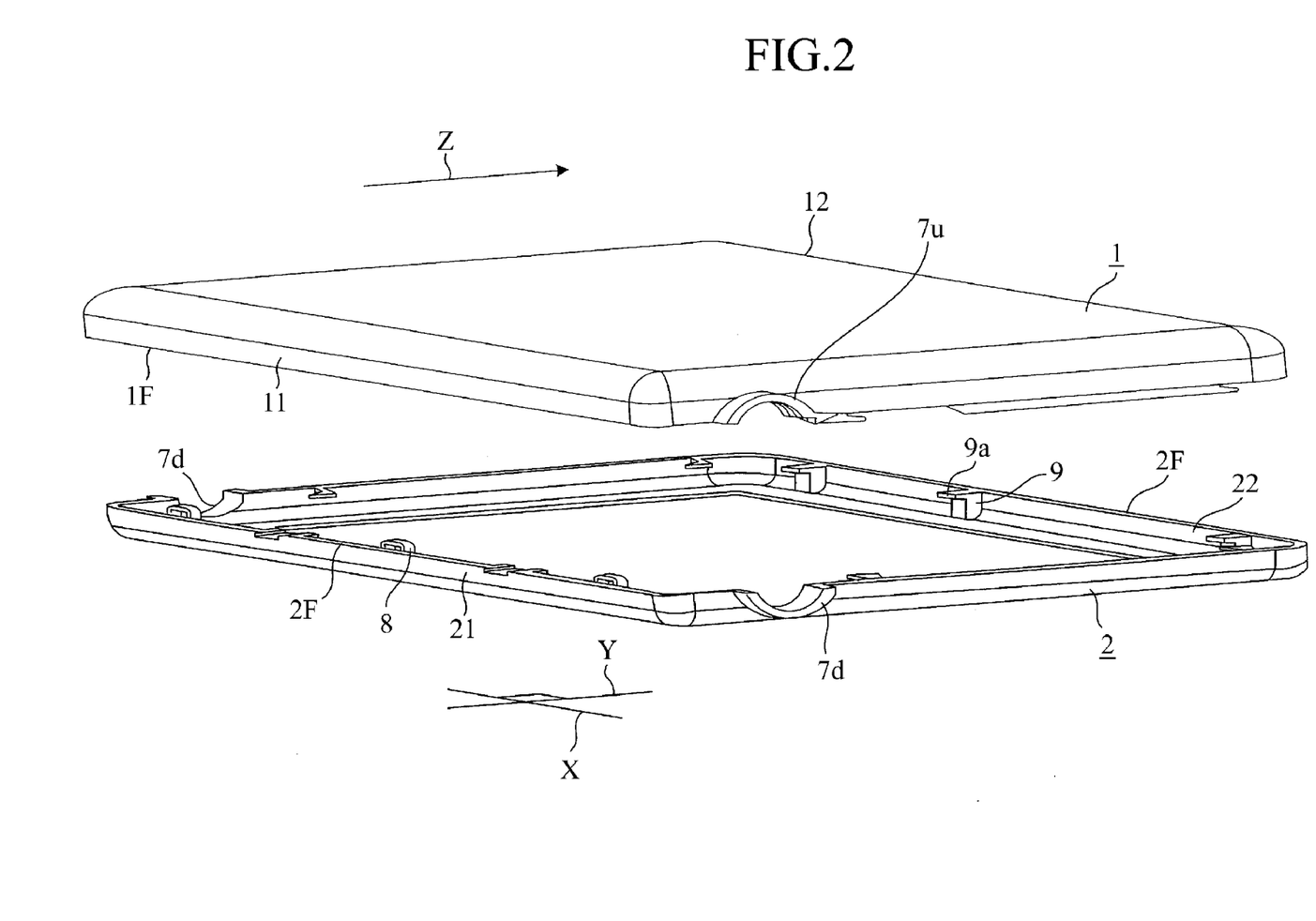
FIG. 2 is an exploded perspective view showing a back panel and a front panel.
Figure 3:
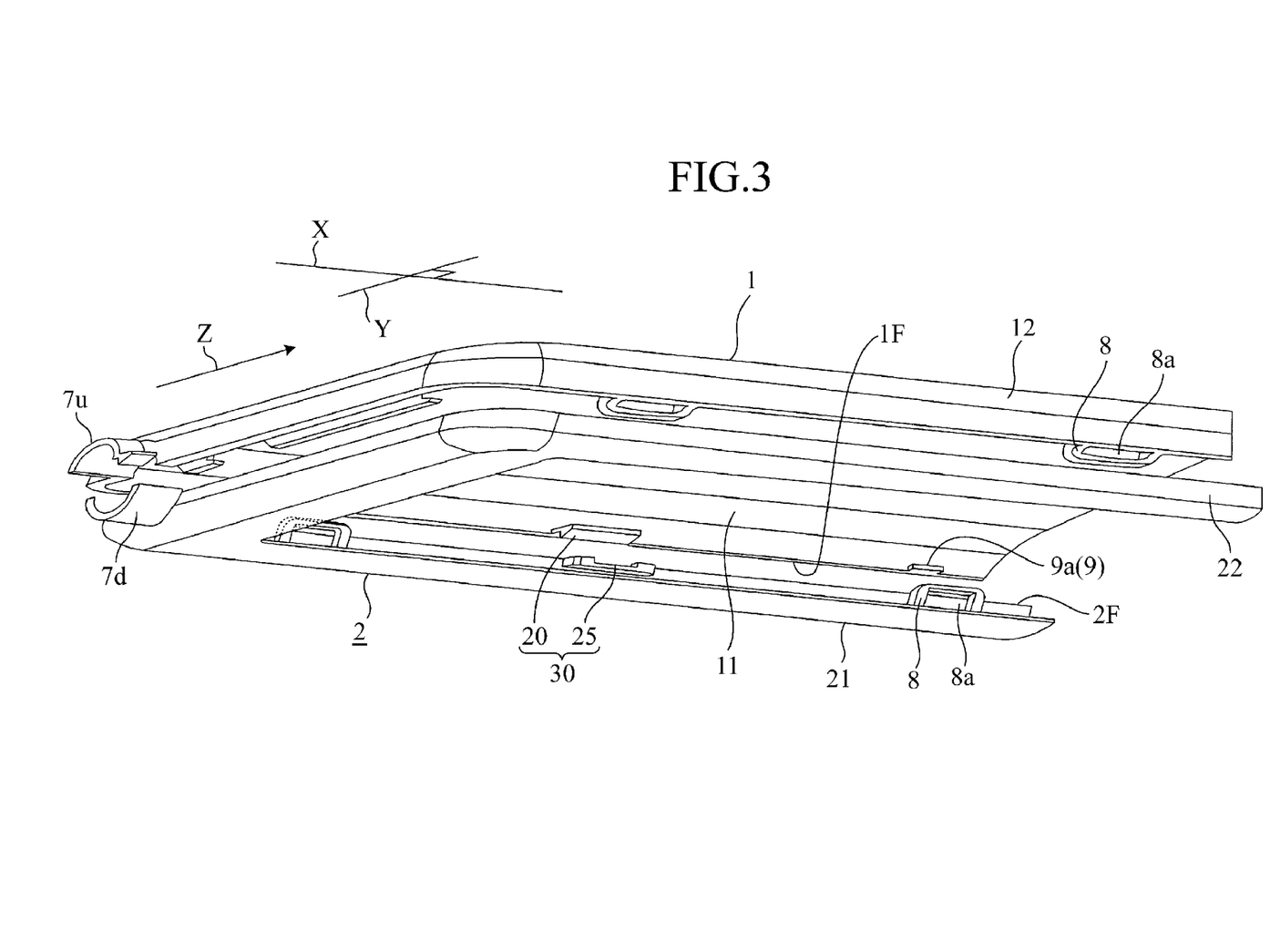
FIG. 3 is an exploded perspective view showing the back panel and the front panel.
Figure 5:
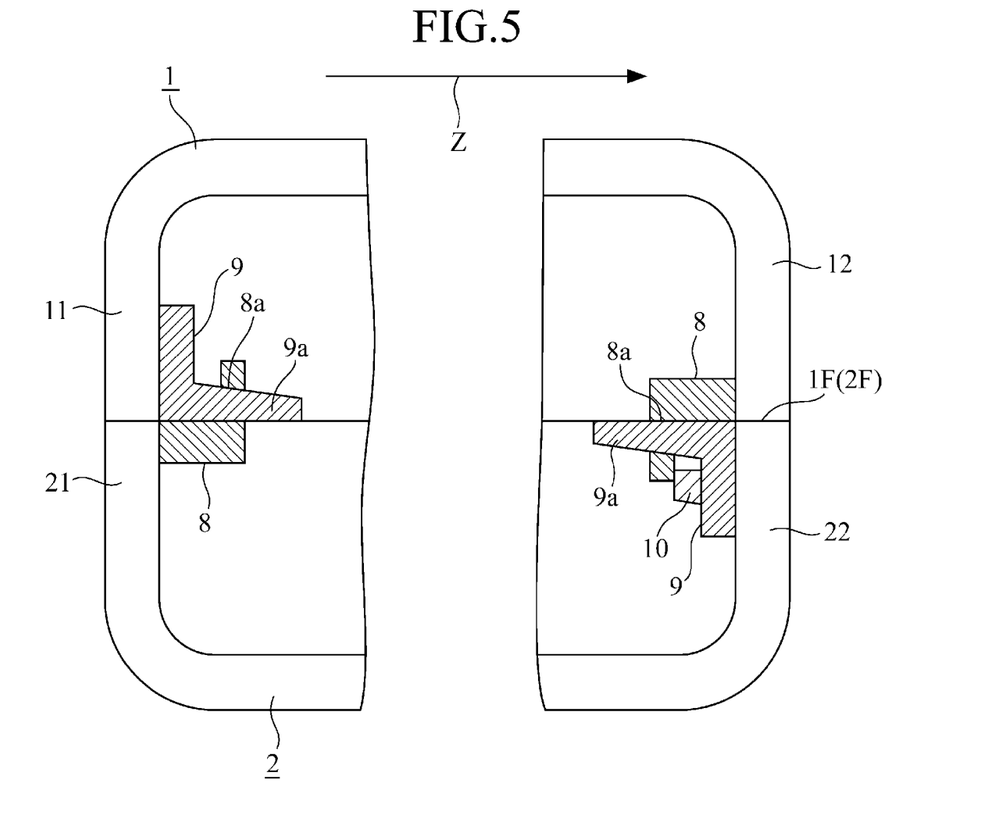
FIG. 5 is a partially sectional view showing a fitting means arranged on the back panel and the front panel.

In FIG. 2, FIG. 3, and FIG. 5, an annular fitting member 8 with the tip thereof projecting from the mating face 2F is provided on a side portion 21 on the upstream side in the predetermined slide direction Z of the back panel 2. An L-shaped convex fitting member 9 having a convexity 9a for fitting in a bore 8a formed in the annular fitting member 8 is provided on a side portion 11 located on the upstream side in the predetermined slide direction Z of the front panel 1 at the same face level as that of the mating face 1F thereof. However, the convex fitting member 9 is not shown in FIG. 2 since the member is located on the back side of the front panel 1.

As shown in FIG. 3 and FIG. 5, the convexity 9a projects from the convex fitting member 9 provided in the side portion 11 toward the downstream side in the predetermined slide direction Z, that is, toward the interior of the panel. Therefore, by sliding the front panel 1 to the back panel 2 in the predetermined slide direction Z, the convexity 9a of the convex fitting member 9 working as a second fitting member provided on the front panel 1 is fitted in the annular fitting member 8 working as a first fitting member provided on the back panel 2. Those annular fitting member 8 provided on the back panel 2 and convex fitting member 9 provided on the front panel 1 constitute a pair of fitting means.

(Another Pair of Fitting Means)

Figure 4:
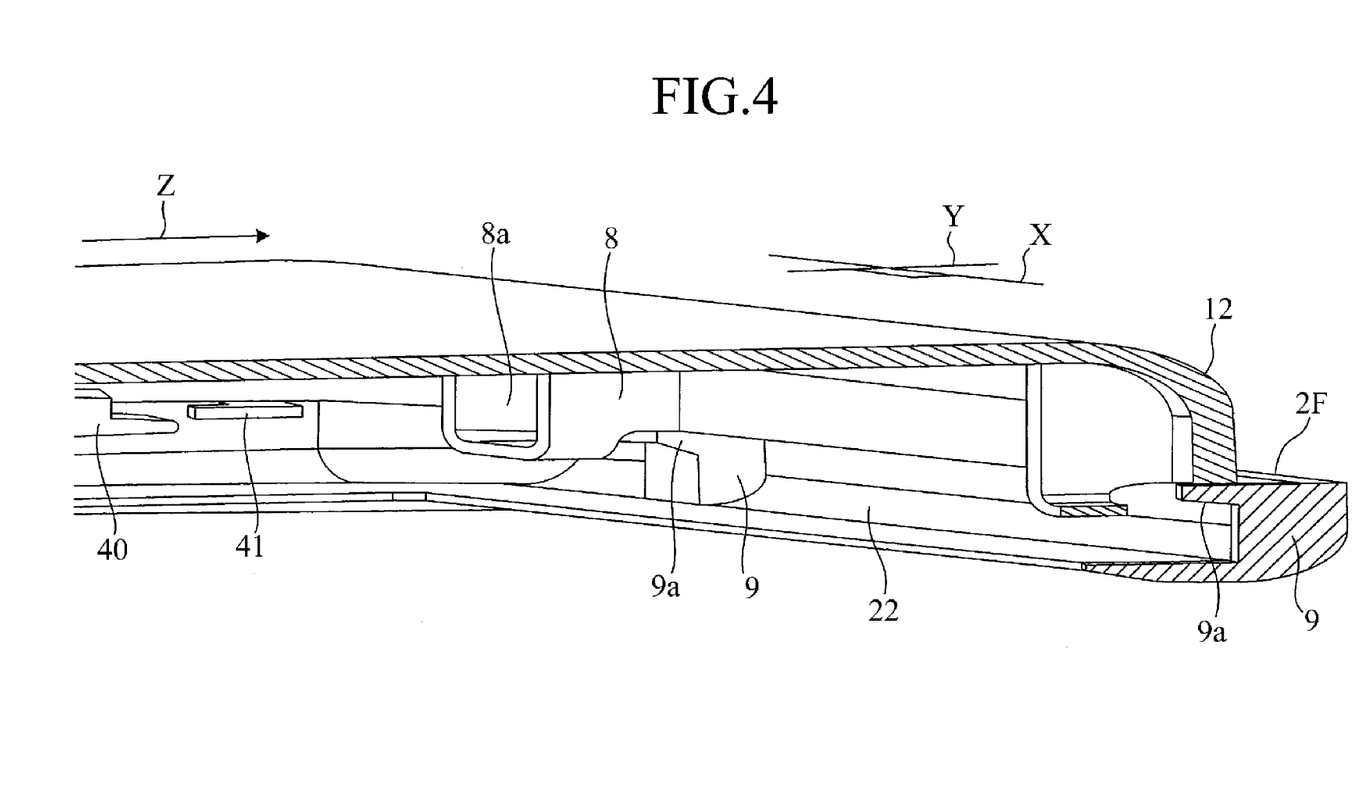
FIG. 4 is a perspective view showing a fitting means arranged on the back panel and the front panel.

In FIG. 2, FIG. 4, and FIG. 5, on a side portion 22 on the downstream side in the predetermined slide direction Z of the back panel 2, is provided a convex fitting member 9 of L shape having a convexity 9a at the face level same as that of the mating face 2F thereof. Referring to from FIG. 3 to FIG. 5, on a side portion 12 on the downstream side in the predetermined slide direction Z of the front panel 1, is provided an annular fitting member 8 having a bore 8a for having fitting engagement with a convexity 9a formed on a convex fitting member 9 of the opposing side portion 22 with the tip thereof projecting from the mating face 1F. However, the convex fitting member 9 is not shown in FIG. 2 since the member is located on the back side of the front panel 1.

As shown in FIG. 4 and FIG. 5, the convexity 9a provided on the opposing side portion 22 projects from the convex fitting member 9 toward the upstream side in the predetermined slide direction Z, that is, toward the interior of the panel. Therefore, by sliding the front panel 1 to the back panel 2 in the predetermined slide direction Z, the annular fitting member 8 working as a second fitting member provided on the front panel 1 goes to a state of fitting engagement with the convex fitting member 9 working as a first fitting member provided on the back panel 2. Those convex fitting member 9 provided on the back panel 2 and annular fitting member 8 provided on the front panel 1 constitute a pair of fitting means.

Thus, the convexity 9a provided in the side portion 22 located on the downstream side in the predetermined slide direction Z of the back panel 2 is formed so as to face toward the upstream side in the predetermined slide direction Z and the convexity 9a provided in the side portion 11 located on the upstream side in the predetermined slide direction Z of the front panel 1 is formed so as to face toward the downstream side in the predetermined slide direction Z. That arrangement can bring about a mating state established by fit between both the panels only by sliding the front panel 1 in the predetermined slide direction Z without providing fitting members at the exterior of the panels.

In the example, the fitting members constituting one pair of fitting means each on the upstream side and the downstream side in the predetermined slide direction Z are disposed alternately with each other on the front panel 1 and the back panel 2. That arrangement makes it possible to make a plurality of fits in the predetermined slide direction Z by using and disposing fitting members having the same shape at the interior of the panels. Hereupon, the bore 8a in the annular fitting member 8 may be substituted by a hole or a concavity.

Figure 6:
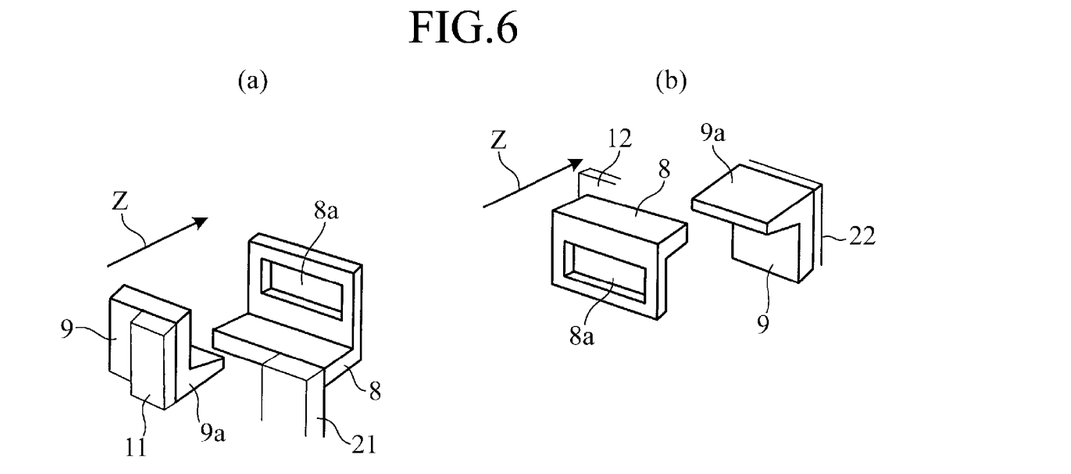

The convexity 9a is arranged to fit in the annular fitting member 8, and by providing the convexity 9a with inclination for gradually increasing or reducing the degree of contact between the convexity and the bore 8a in the predetermined slide direction Z, it is possible to cause the convexity to act on the fitting member with which the convexity is in engagement such that connection between the mating faces is strengthened, or misalignment between the panels or mismesh therebetween is prevented. For example, as shown in FIG. 5 and FIG. 6, tapering the convexity 9a can change the strength of connection between the mating faces 1F, 2F.

It is arranged that the convexity 9a fit in the annular fitting member 8, and the front panel 1 and the back panel 2 can be mated with each other without a gap and without an external misalignment. A plurality of fitting means are arranged to be provided therein, and thus, if the accuracy of fit thereof is high, the occurrence of misalignment between the back panel 2 and the front panel 1 at the mating surface in a direction crossing the predetermined slide direction Z can be prevented. Further, it is possible to easily arrange the convex fitting member 9 to butt the annular fitting member 8 at an appropriate moved position to stop thereat such that the movement of the front panel in the predetermined slide direction Z is made so as not to exceed the proper mating position of both the panels. For instance, in FIG. 5, the arrangement is easily achieved by attaching a stopper 10 for preventing the overrunning of the annular fitting member 8 provided in the side portion 12 on the convex fitting member 9 provided in the side portion 22.

The portions at which the annular fitting member 8 is fitted over the convexity 9a have respective tapered faces, and the tapered faces serve as a guide for the slide fit, thus enabling the assembly to be easily done and a rattle and external misalignment to be prevented after the panels are assembled.

(Lock Means)

A lock means is necessary for preventing the front panel 1 from be misaligned with respect to the back panel 2 toward the upstream side in the predetermined slide direction Z to maintain the fitting state formed by the plurality of pairs of fitting means and for releasing such maintenance as required. In the simplest manner, the lock means is possible by providing a pin that is insertable and extractable to/from the panels and that passes through both of the thick wall portions of the back panel 2 and the front panel 1. However, the pin can be extracted too easily; contrarily, it cannot be extracted due to too tight fitting when the need arises; Moreover, the extracted pin may be lost.

Second Embodiment (Lock Means Provided in Proximity to a Pair of Fitting Means)

As a general arrangement shown in FIG. 3 by way of example, a lock means 30 is disposed in proximity to the annular fitting member 8 and the convex fitting member 9 constituting a pair of fitting means, and is composed of a hooked member 20 provided at the interior in the side portion 11 of the front panel 1, and a plate-shaped latch member 25 for latching the hooked member 20. As the front panel 1 is slid in the predetermined slide direction Z to the back panel 2 for the purpose of the fit of a pair of fitting members, the engagement of the hooked member 20 to the latch member 25 is carried out, and the latch function thereof prevents the fit from being detached by a misalignment between the two panels. Further, there is provided therein a release means for releasing the lock state.

Example 1

Figure 7:
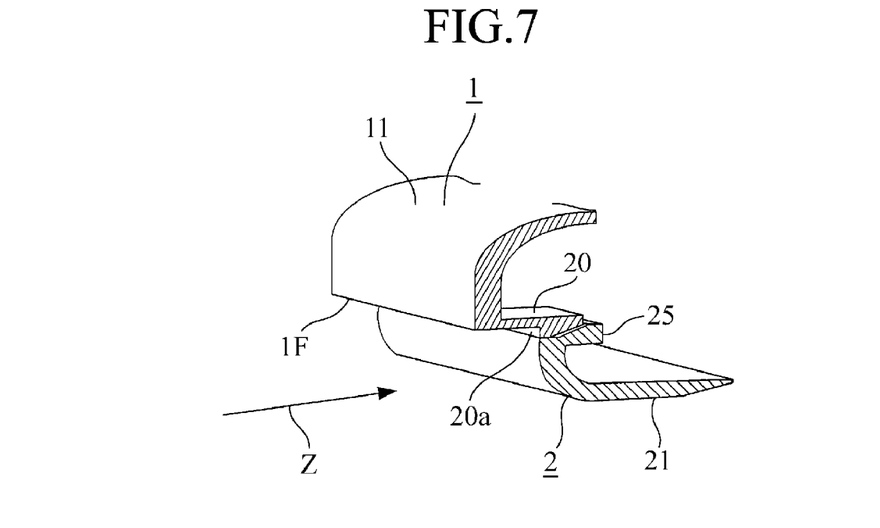
FIG. 7 is a perspective view illustrating a lock means by way of example.
Figure 8:
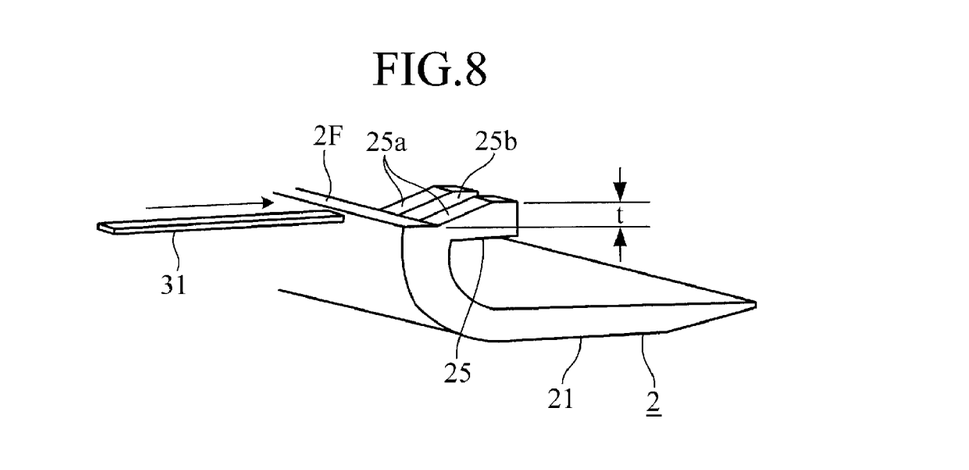
FIG. 8 is a perspective view explaining a latch member.

FIG. 7 and FIG. 8 are illustrated under magnification.

In these examples, the top face of the latch member 25 forms an inclined face 25a becoming an ascending slope from the upstream side to the downstream side in the predetermined slide direction Z. Such a structure smoothes the riding of the hooked member 20 thereon, but creates a clearance t between the back panel 2 and the front panel 1 by the inclination. An operation leading to the lock is as follows: the hooked member 20 is resiliently deformed with the base-end side thereof as a fulcrum to be flexed as the front panel 1 moves in the predetermined slide direction Z, and when a shoulder 20a formed at the edge of the bottom face inclined section of the hooked member 20 passes over the end of the latch member 25, the shoulder 20a engages with the end of the latch member 25 to be held. In such a state, the shoulder 20a is caught at the end of the latch member 25, and thus the front panel 1 is restrained from moving in the opposite direction to the predetermined slide direction Z.

In order to release the engagement, a stick 31 is inserted through a clearance between the mating face 1F and the mating face 2F and a clearance 25b formed between the two inclined faces 25a, and the mated two panels are pried open by pushing the tip of the hooked member 20 from the bottom to the top with the tip of the stick 31 with the mating face 2F as a fulcrum. In such a way, the tip of the latch member 25 is upwardly shifted, and the shoulder 20a is detached from the end of the latch member 25 to release the locking state.

Example 2

Figure 9:
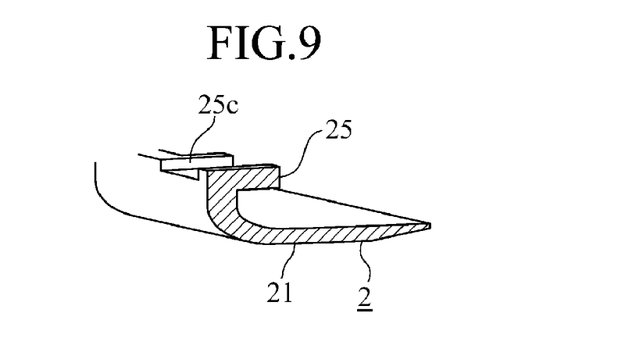
FIG. 9 is a perspective view explaining a latch member.
Figure 10:
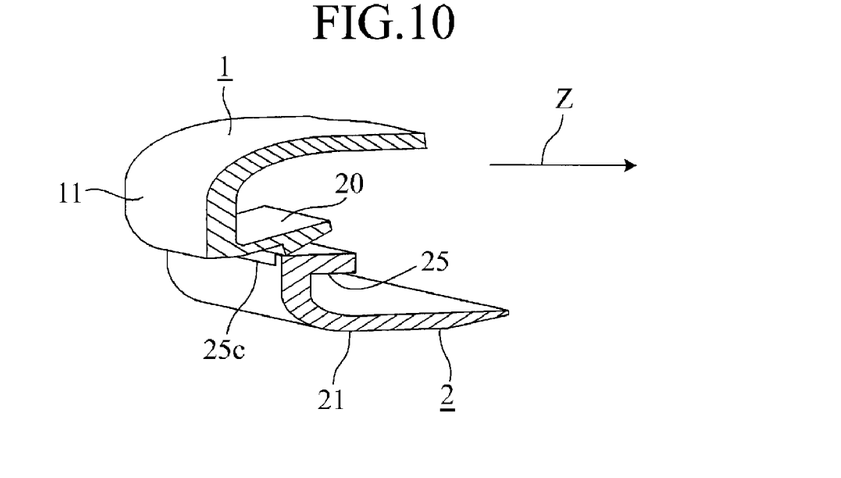
FIG. 10 is a perspective view explaining a process of a hook member leading to a latched state.

In the example, as shown in FIG. 9, the top face of the latch member 25 has a plane parallel to the predetermined slide direction Z. Such a structure does not create a clearance between the back panel 2 and the front panel 1. A groove 25c for receiving the stick 31 to be inserted thereinto is previously formed on the top face of the latch member 25.

An operation leading to the lock engagement is as follows: as in Example 1, the hooked member 20 is resiliently deformed with the base-end side thereof as a fulcrum to be flexed as the front panel 1 moves in the predetermined slide direction Z, and when a shoulder 20a formed on the bottom face of the hooked member 20 passes over the end of the latch member 25, the shoulder 20a engages with the end of the latch member 25 to be held thereby (see FIG. 11). In such a state, the shoulder 20a is caught by the latch member, and thus the front panel 1 is restrained from moving in the opposite direction to the predetermined slide direction Z.

Figure 11:
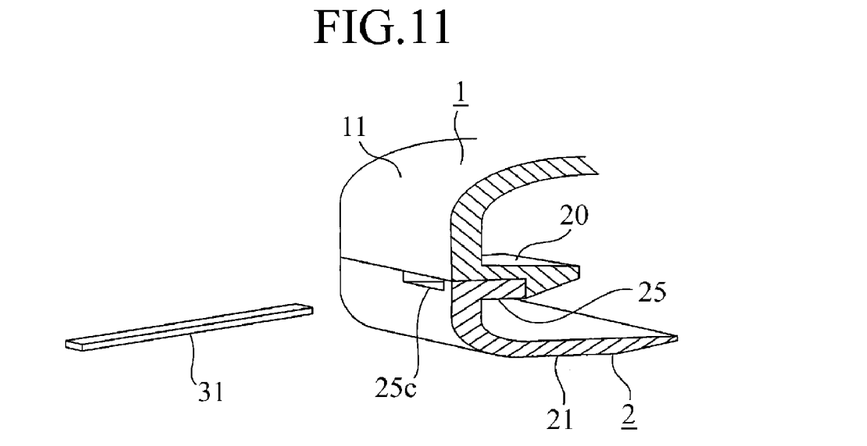
FIG. 11 is a perspective view showing the hooked member and the latch member placed in a locked state.
Figure 12:
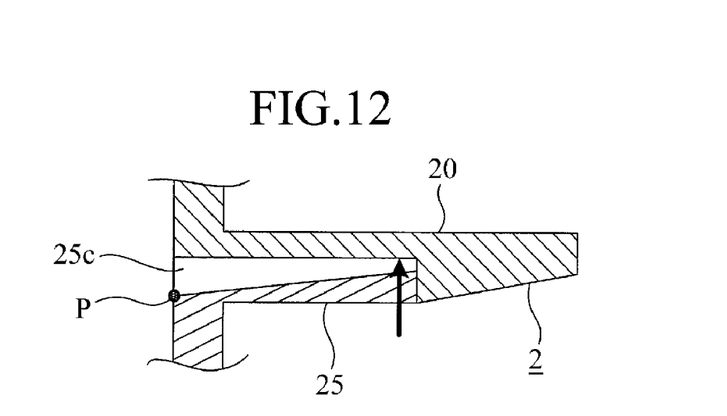
FIG. 12 is a sectional view explaining a method for releasing the hooked member and the latch member placed in a locked state.

In order to release the engagement, a stick 31 is inserted, as shown in FIG. 11, through a groove 25c, and the mated two panels are pried open, as shown in FIG. 12, by rocking the tip of the hooked member 20 from the bottom to the top with the tip of the stick 31 using the end of the groove 25c as a fulcrum P. In such a way, the tip of the latch member 25 is upward displaced as shown by an arrow, and the shoulder 20a is detached from the end of the latch member 25 to release the locking state.

Example 3

Figure 13:
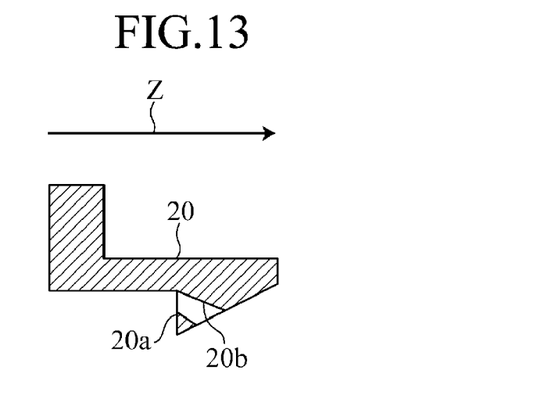
FIG. 13 is a sectional view of a hooked member.
Figure 14:
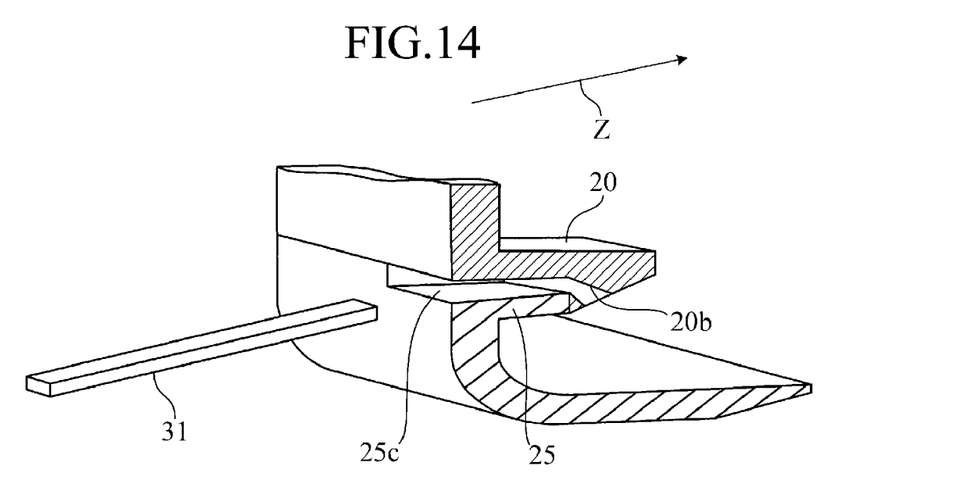
FIG. 14 is a perspective view explaining a method for releasing the hooked member and the latch member placed in a locked state.

Though in Examples 1 and 2 the stick 31 is rocked, in the example the stick 31 is pushed and moved in the predetermined slide direction Z to release the lock state. As a preparation therefor, as shown in FIG. 13, an inclined face 20b is previously provided within the tip of the hooked member 20 together with a hole and is inclined following a tendency to descend along the predetermined slide direction Z. In order to release the lock state, the stick 31 is thrust through the groove 25c as shown in FIG. 14. The tip of the stick 31 abuts against the inclined face 20b, and the stick 31 is further thrust with the groove 25c as a guide. Thus, the tip of the stick 31 abuts against the inclined face 20b in due course, and the inclined face is pushed up to thereby detach the inclined face 20b from the end of the latch member 25 and release the locking state.

Example 4

Figure 15:
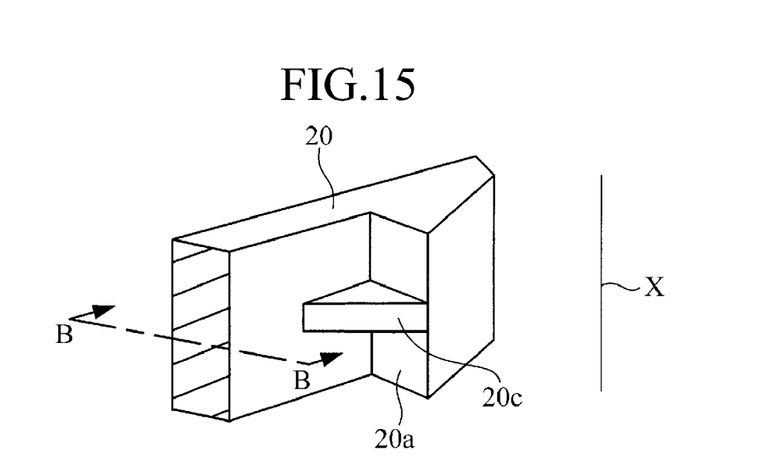
FIG. 15 is a perspective view of a hooked member.

In the example, the hooked member 20 is pushed up based on the same principle as that in Example 3 to release the locking state. As shown in FIG. 15, in the portion of the shoulder 20a, a triangular inclined board 20c having a function similar to the inclined face 20b in Example 3 discussed above is arranged to be provided integral with the shoulder in a generally central portion in the transverse direction X. In this way, when an inclined board 20c is provided, the shoulder 20a is blocked. Thus, in order to prevent the blockage, the latch member 25 is previously provided with a concavity 25e for avoiding interference with the inclined board 20c as shown in FIG. 16.

Figure 16:
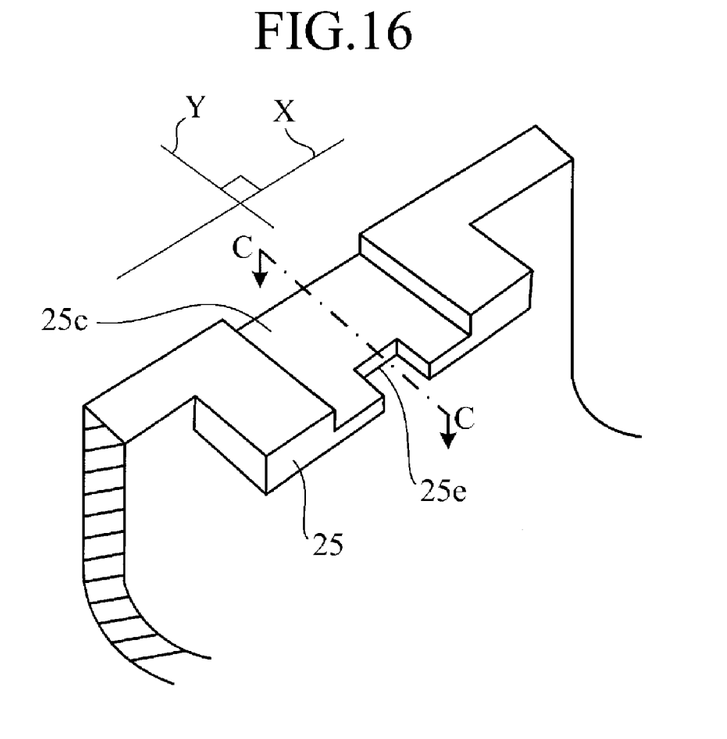
FIG. 16 is a perspective view of a latch member.
Figure 17:
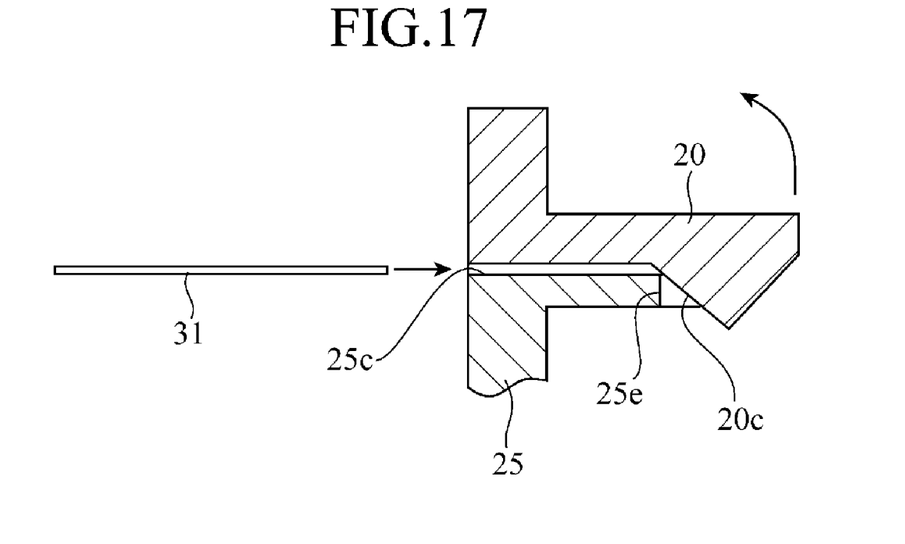
FIG. 17 is a front view explaining a method for releasing the hooked member and the latch member placed in a locked state.

FIG. 17 shows a sectional view taken along the line B-B of the hooked member 20 in FIG. 15, and a sectional view taken along the line C-C of the latch member 25 in FIG. 16. In order to release the lock state, the stick 31 is thrust into through the groove 25c as shown in FIG. 17. The tip of the stick 31 abuts against the inclined board 20c, and the stick 31 is further thrust into with the groove 25c as a guide. In due time, the inclined board 20c is pushed up by the tip of the stick 31 to be detached from the end of the latch member 25 to thus release the locking state.

The lock means shown in those examples is disposed in proximity to the pair of fitting members as shown in FIG. 3.

Figure 18:
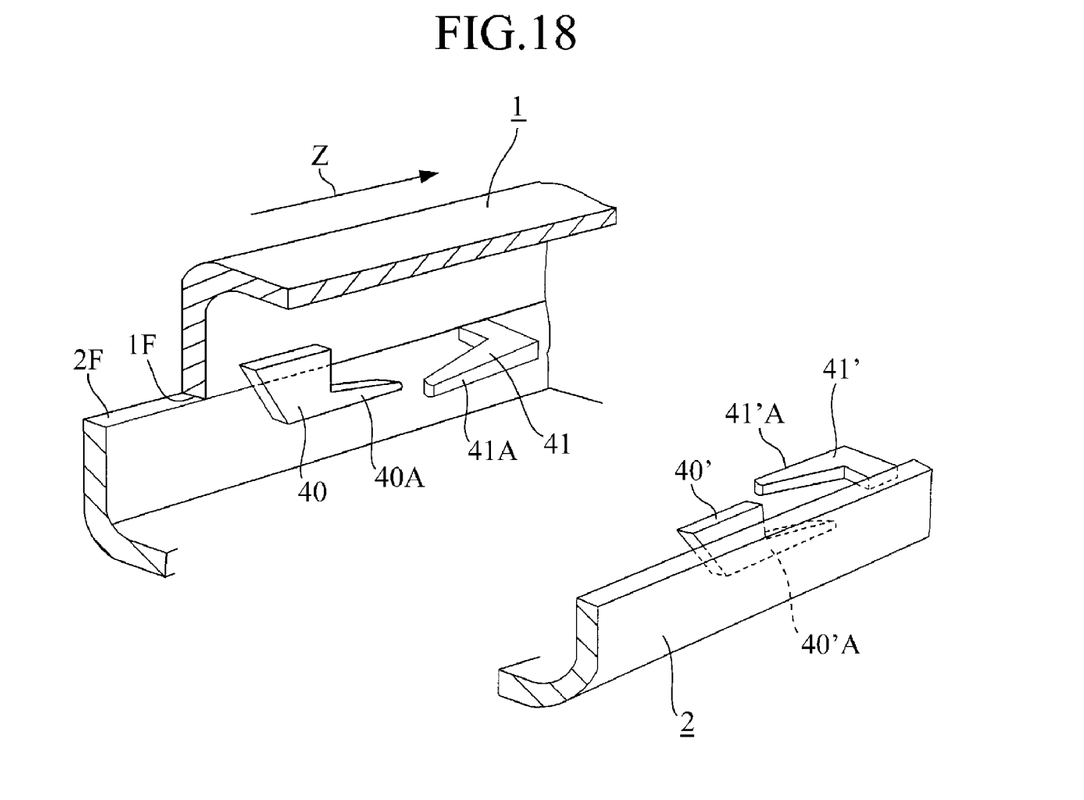
FIG. 18 is a perspective view illustrating a pair of fitting means composed of plates by way of example.

Third Embodiment (Fitting Structure in Which L-shaped Plates are Fitted With Each Other For the example of a pair of fitting means for placing the back panel 2 and the front panel 1 in a mated condition, the examples of the annular fitting member 8 and the convex fitting member 9 are explained. However, the example is another one. As shown in FIG. 18, a first and a second fitting members constituting a pair of fitting means located on the obliquely left side in the figure each consist of an L-shaped plate, a plate 40 constituting the first fitting member is secured at the interior of the sidewall in the transverse direction of a front panel 1, and a plate 41 constituting the second fitting member is secured to the sidewall in the transverse direction of a back panel 2.

The plate face of the plate 40 is provided along the vertical direction, while the face of the plate 41 is provided along the horizontal direction. A convex engaging section 40A, which is part of the plate 40 and extends to the downstream side in the predetermined slide direction Z, has a tapered shape of a tendency to be narrower in the vertical direction with advancing to the downstream side. A convex engaging section 41A, which is part of the plate 41 and extends to the upstream side in the predetermined slide direction Z, has a tapered shape of a tendency to be narrower in the horizontal direction with advancing to the upstream side.

The tapered plates afford an example of an inclined section for acting on the other fitting member placed in a fitting state so as to tighten the connection between the mating faces or prevent mismesh between the connection sections.

When the front panel 1 is slid to the back panel 2 in the predetermined slide direction Z, the convex engaging section 40A contacts the plate 41 from the underside of the plate 41 to engage with the plate. Moreover, the convex engaging section 41A contacts the plate 40 from inside to outside in the transverse direction to engage with the plate.

Also on the obliquely right side in the figure, L-shaped plates 40', 41' constituting a pair of fitting means are arranged to be disposed in a symmetric relation to the plates 40, 41. When the front panel 1 is slid to the back panel 2 in the predetermined slide direction Z, the convex engaging section 40'A that is part of the plate 40' contacts the plate 41' from the underside of the plate 41' to engage with the plate. Further, the convex engaging section 41'A that is part of the plate 41' contacts the plate 40' from inside to outside in the transverse direction X to engage with the plate.

Figure 19:
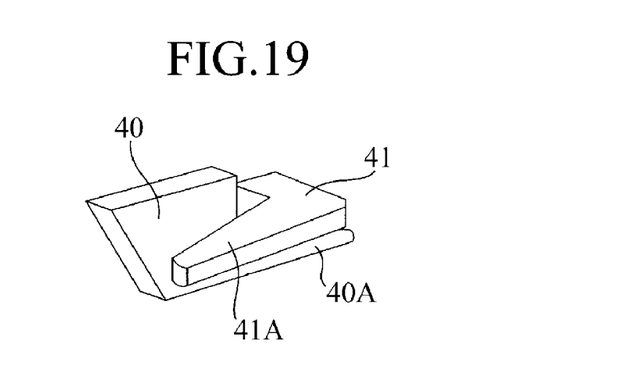
FIG. 19 is a perspective view showing a state in which the pair of fitting means composed of plates is in engagement with each other.
Figure 20:
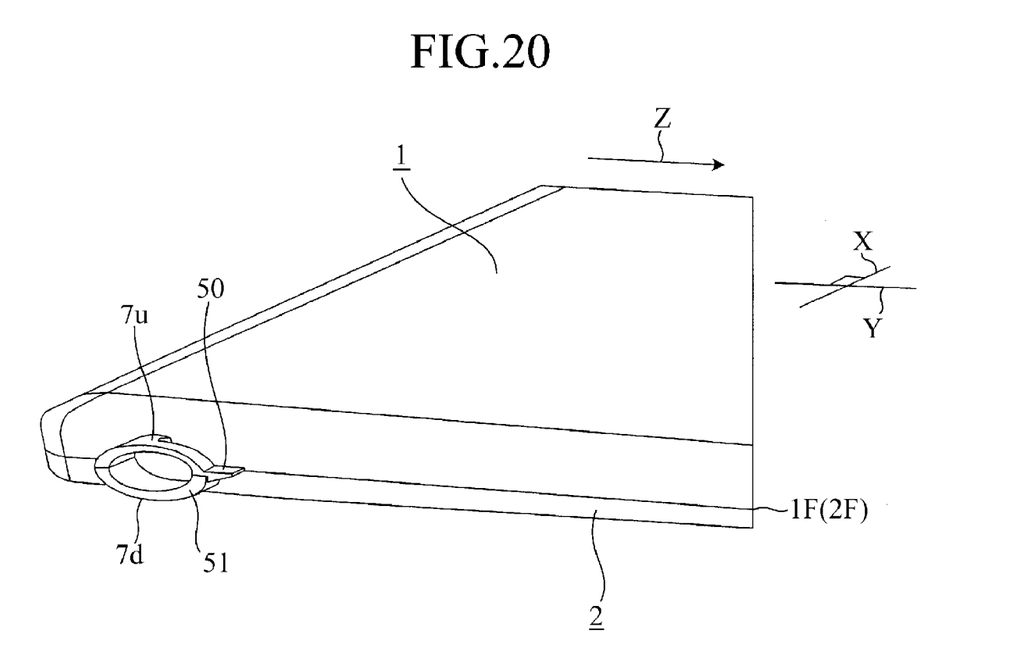
FIG. 20 is a perspective view illustrating a lock means arranged on protrusions by way of example.
Figure 21:
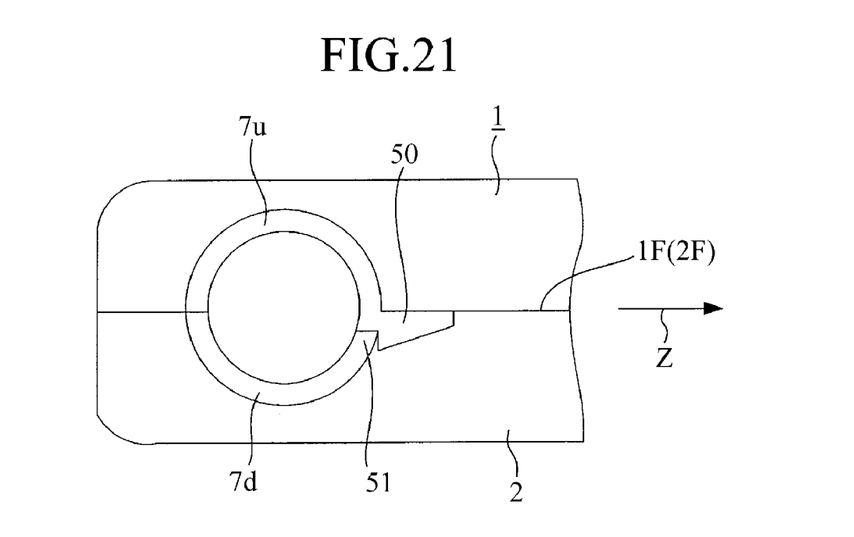
FIG. 21 is a front view illustrating a lock means arranged on protrusions by way of example.

FIG. 19 illustrates an engaging state of the fitting means. The strength of engagement between the fitting means is enhanced as the front panel 1 advances in the predetermined slide direction Z. Therefore, the strength of connection between the mating faces 1F, 2F is gradually increased, and backlash between the front panel 1 and the back panel 2 has a tendency to be progressively reduced. The engaging sections serve as a guide upon sliding of the panel, and also the occurrences of rattle and external misalignment after assembly can be reduced on the side faces. A combination of the fitting means with the example of the annular fitting member 8 and the convex fitting member 9 is desirable, which is not limited thereto; it can also be independently formed as an engaging means in place of the annular fitting member 8 and convex fitting member 9. Even in that case, a combination thereof with the above-discussed lock means is preferable.

Fourth Embodiment (Lock Means Provided on Protrusions for Holding a Shaft)

In FIG. 2, FIG. 3, and FIG. 21 to FIG. 22, a protrusion 7u is provided with a hooked member 50 constituting a lock means, and a protrusion 7d is provided with a latch member 51 for latching the hooked member 50.

Figure 22:
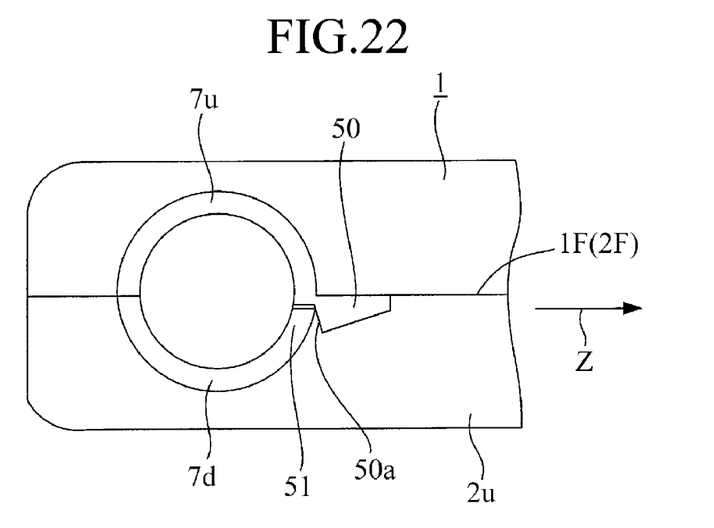
FIG. 22 is a front view illustrating a lock means arranged on a protrusion by way of example.

The relation between the hooked member 50 and the latch member 51 is similar to that between the hooked member 20 and the latch member 25 for latching the hooked member 20 as explained in FIG. 7 to FIG. 17. The protrusions 7u, 7d are used to constitute a lock means, which can render a positive locking function. The release of the lock is carried out by resiliently deforming the hooked member 50 by an external force. The lock means composed of the hooked member and the latch member is provided in proximity to the above-discussed pair of fitting means, which enables the fitting means placed in a fitting state to be locked in a properly fitting state containing no errors. As shown in FIG. 22, when an abutting section of the hooked member 50 against the latch member 51 is formed by the inclined face 50a pressing the latch member 51 in the predetermined slide direction, the front panel 1 is normally pressed toward the back panel 2 in the predetermined slide direction Z through the inclined face 50a; thus, the fit between the pair of fitting means is not loosened.

In the example, one place internally across the side portions in the longitudinal direction X, and one place internally across the side portions in the transverse direction Y of the back panel 2 and the front panel 1 are provided with one pair of fitting means composed of the annular fitting member 8 and the convex fitting member 9, and one pair of fitting means composed of the plates 40, 41, respectively; and further one place internally across the side portions in the longitudinal direction X of the back panel 2 and the front panel 1 and one place across the protrusions 7u, 7d for holding the shaft each are provided with a lock means, thus ensuring the fitting engagement between the back panel 2 and the front panel 1, and also enabling disassembly thereof.

Though a back panel is conventionally fixed to a front panel with screws, disuse of screws becomes possible by employing the present invention, and thereby reduced components and reduced assembling steps enable cost down. Furthermore, since the fitting section is not broken upon disassembling of the panels, reuse of the panels can be expected. Besides, an increase of the number of fits having a convex shape makes effective for large displays.

INDUSTRIAL APPLICABILITY

As discussed above, the display panel fitting structure according to the present invention, in order to provide a display panel fitting structure in which components are readily assembled and disassembled, and which working processes for building are also simple, the fitting structure includes two or more pairs of fitting means each composed of a first fitting member provided on one of two panels which are detachably fixed to and held by each other with mating faces thereof mated with each other and a second fitting member which is provided on the other of the two panels and can engage with the first fitting member, wherein each fitting member is disposed such that the fit between each of the two or more pairs of fitting means is made by slide of one of the two panels in a predetermined sliding direction determined as a direction in which the panel is slid with respect to the other panel when the panels are assembled, and wherein also the display panel fitting structure further includes a lock means which can maintain the fitting state established by the fitting means and release the fitting engagement of the fitting means. Thus, the display panel fitting structure is suitable for use in a fitting structure of a liquid crystal display panel that internally includes a board or the like, or the equivalent.

The invention claimed is:

1. A display panel fitting structure including two or more pairs of fitting unit each composed of a first fitting member provided on one of two panels which are detachably fixed to and held by each other with mating faces thereof mated with each other and a second fitting member which is provided on the other of the two panels and enables to engage with the first fitting member, wherein the fitting members are disposed such that each fit in the two or more pairs of fitting unit is made by slide of one of the two panels in a predetermined sliding direction determined as a direction in which the panel is slid with respect to the other panel when the panels are assembled, wherein the display panel fitting structure further includes a lock unit enabling to maintain the fitting state established by the fitting unit and release the fitting engagement of the fitting unit, wherein the lock unit includes a hooked member and a latch member for latching the hooked member, and the positional relation between the hooked member and the latch member is determined such that the engagement of the hooked member with the latch member is made as the panel is slid in the predetermined sliding direction to make a fit and the hooked member is latched by the latch member to go to a lock state, and wherein the hooked member and the latch member are provided on respective protrusions for holding a shaft that project from the vicinity of the respective mating faces of the two panels outwardly from the panels.

* * * * *